US010627351B2

(12) United States Patent
Nesbitt et al.

(10) Patent No.: US 10,627,351 B2
(45) Date of Patent: Apr. 21, 2020

(54) INSPECTION OF COMPONENTS FOR IMPERFECTIONS (71) Applicant: Redlux Limited, Hampshire (GB)

(72) Inventors: John Michael Nesbitt, Southampton (GB); Sergio Gonzalez Llorente, Southampton (GB)

(73) Assignee: Redlux Limited, Hampshire (GB)

(*) Notice: Subject to any disclaimer, the term of this patent is extended or adjusted under 35 U.S.C. 154(b) by 0 days.

(21) Appl. No.: 16/473,792

(22) PCT Filed: Feb. 20, 2018

(86) PCT No.: PCT/EP2018/054091
§ 371 (c)(1),
(2) Date: Jun. 26, 2019

(87) PCT Pub. No.: WO2018/177655
PCT Pub. Date: Oct. 4, 2018

(65) Prior Publication Data
US 2019/0339208 A1    Nov. 7, 2019

(30) Foreign Application Priority Data
Mar. 29, 2017  (GB) .................................. 1705052.7

(51) Int. Cl.
G01N 21/93    (2006.01)
G06T 7/62     (2017.01)
(Continued)

(52) U.S. Cl.
CPC ......... G01N 21/93 (2013.01); G01N 21/8806 (2013.01); G06T 7/001 (2013.01);
(Continued)

(58) Field of Classification Search
CPC .............. G01N 21/93; G01N 21/8806; G01N 2021/8822; G06T 7/62
See application file for complete search history.

(56) References Cited

U.S. PATENT DOCUMENTS

2014/0268105 A1* 9/2014 Bills .................... G03H 1/0866
356/51

FOREIGN PATENT DOCUMENTS

DE   10 2015 201 823 A1   8/2016
EP        0 605 990 A2    7/1994
(Continued)

OTHER PUBLICATIONS

Scratch and Dig Visibility Comparison Set, 2013, http://savvyoptics.com/files/D-668_product_description.pdf, retrieved Jan. 3, 2020 (Year: 2013).*
(Continued)

Primary Examiner — Steven Whitesell Gordon
(74) Attorney, Agent, or Firm — Renner, Otto, Boisselle & Sklar, LLP (57) ABSTRACT An inspection method for optical components that can be implemented to conform to performance specification MIL-PRF-13830 in order to grade surface imperfections, in particular scratches and digs. A dark-field microscope obtains a digital image of the component, and this digital image is processed to determine scratch and dig numbers. For scratches, the number is obtained by dividing the total intensity of the scratch by the scratch length. For digs, the number is obtained by determining dig diameter or by dividing the dig's total intensity by its area. According to our extensive testing, this automated digital image processing approach appears to faithfully mimic the subjective impression that a scratch makes on an expert inspector who is applying the visibility test of MIL-PRF-13830.

20 Claims, 7 Drawing Sheets (51) Int. Cl.
*G01N 21/88* (2006.01)
*G06T 7/00* (2017.01)

(52) U.S. Cl.
CPC ........ *G06T 7/62* (2017.01); *G01N 2021/8822* (2013.01); *G06T 2207/10056* (2013.01); *G06T 2207/10144* (2013.01); *G06T 2207/20036* (2013.01)

(56) References Cited

FOREIGN PATENT DOCUMENTS

| | | |
|---|---|---|
| IE | 914411 A1 | 7/1992 |
| WO | 02/25708 A2 | 3/2002 |

OTHER PUBLICATIONS

Dana Takaki et al: "Objective Scratch and Dig Measurements", Nov. 12, 2012 (Nov. 12, 2012), XP055468781, Retrieved from the Internet: URL:http://www.savvyoptics.com/files/Objective_scratch_and_dig_measurements_-_Takaki_20122.pdf [retrieved on Apr. 19, 2018] abstract; figures 1, 2a, 2b, 5, 6, pp. 1, 4-7.

David M Aikens: "The Truth About Scratch and Dig", Jan. 1, 2010 (Jan. 1, 2010), XP055468765, Retrieved from the Internet: URL:https://www.lambdaphoto.co.uk/pdfs/Savvy/The%20Truth%20About%20Scratch%20and%20Dig.pdf [retrieved on Apr. 19, 2018] abstract; figure 1, pp. 1-2.

Crystran Web Disclosure, page dates from Mar. 6, 2016, downloaded Mar. 15, 2017, https://www.crystran.co.uk/metrology.

International Search Report and Written Opinion for corresponding Patent Application No. PCT/EP2018/054091 dated May 2, 2018.

* cited by examiner

Scratch-Dig Surface Quality Certification

| Part Number | Inspector | Date |

Result: PASS

Component shape: circular
Component size: ϕ40mm

Max. Scratch Number: 80
Max. Dig Number: 10
No of Scratches: 5
No of Digs:2

*Top 5 Scratches*
S1-#80  L=2.018mm
S2-#40  L=1.014mm
S3-#40  L=0.521mm
S4-#20  L=2.005mm
S5-#10  L=1.003mm

*Top 5 Digs*
D1-#10  ϕ8.4μm
D2-#10  ϕ6.8μm

INSPECTION OF COMPONENTS FOR IMPERFECTIONS

BACKGROUND OF THE INVENTION

The invention relates to the inspection of components, in particular optical components, to assess imperfections.

In 1963, the US Department of Defense defined a performance specification for inspecting optical components either in reflection or transmission, which was assigned the code MIL-O-13830A. The reflection variant is widely used to this day, but the transmission variant is not widely used. The originally envisaged optical components were lenses, prisms, mirrors, reticles, windows and wedges. In 1997 the performance specification was revised into the current version MIL-PRF-13830B. The contents of both of these performance specification documents are incorporated herein by reference in their entirety.

Manufacturers of optical components are expected by customers to test their product against MIL-PRF-13830 and supply a specification sheet listing the imperfections that are present on each component and assigning a grade to each. The performance specification considers two types of imperfection: scratches and digs. A dig is a pit. The performance specification is based on a visual inspection carried out by a human operator—an inspector—who compares imperfections in the component to inspect against reference imperfections present in one or more reference components. For scratches, the performance specification grades them by their visibilty. For digs, the performance standard grades them by their diameter, i.e. by a geometric parameter, in ten micrometre increments. However, since dig diameter is determined by visual inspection by an inspector, digs are also in effect graded by visibility. A set of reference components is provided, wherein the set collectively provides all the different grades of imperfection. In the art, the reference components are sometimes referred to as "comparator plates". The scratch grade is a subjective measure of how visible the imperfection appears to the inspector. The scratch grades are 10, 20, 40, 60 and 80, where a higher number relates to a more visible imperfection. The dig grades are in terms of the dig diameter, which for irregularly shaped digs is defined as the average diameter. Other equivalent terms in use for scratches are scratch weighting and scratch brightness.

A set of reference components from a given provider might have one reference component for each scratch grade and another for each dig grade. Other manufacturers might put all grades of scratch on a single reference component and all grades of dig on another single reference component. In principle any mapping between reference imperfections and reference components carrying them is possible.

The inspector has a set of reference components which collectively provide scratches and digs of all the visibility grades: i.e. 10, 20, 40, 60 and 80 for scratches. The inspector holds the test component and one of the reference components alongside each other in his hands in a light box where they are, or at least should be, illuminated with the same lighting conditions. Both components are tilted and the inspector makes a subjective assessment, based on how visible the imperfection appears, of whether a test component imperfection looks brighter or darker than reference imperfections of different grades. Supposing there is a separate reference component for each grade, if the inspector decides the test component imperfection is worse (or better) than that of the reference component, he exchanges the reference component for another from the master set with a higher (or lower) imperfection number and repeats the comparison until he is satisfied he can grade the test component accurately. For example, if a scratch looks worse, i.e. brighter, than the 40 reference scratch, but better, i.e. dimmer, than the 60 reference scratch, then the scratch is graded as a 60 scratch. In other words, an imperfection with a visibility or brightness that lies between two adjacent reference imperfections is graded as the worse grade. This procedure is repeated by the inspector for each visible imperfection on the test component, so in the end a number of imperfections are identified, their location on the test component and their physical extent is recorded and their grade specified.

The test method described in MIL-PRF-13830B requires a specific optical configuration including a range of surface illumination angles and the capture of scattered light from the optical surface with the inspector's (human) eye positioned at a defined distance from the test and reference components. In practice, a dark-field microscope is used to provide the specified configuration.

The performance specification MIL-PRF-13830 is based on an original master set of reference components, which is retained by the Department of Defense. Third party manufacturers of derivative master sets exist, so that optical component manufacturers can purchase their own sets for use in their post-production testing.

One well known and obvious shortcoming of MIL-PRF-13830 is that it relies on the inspector's subjective impression of how visible or bright one imperfection appears to be on one component compared with another imperfection on another component. For example, the same imperfection may be graded consistently by one inspector differently from another inspector. This problem is discussed in the article: "The Truth About Scratch and Dig", David Aikens 2010: (https://www.lambdaphoto.co.uk/pdfs/Savvy/The%20Truth%20About%20Scratch%20and%20Dig.pdf).

However, there is another, more subtle problem which we do not think is known, and we have only discovered by applying our invention as described elsewhere in this document. This other problem relates to the manufacture of derivative master sets by third party manufacturers. The derivative master sets are not precisely manufactured copies of the original master set, but rather are normally manufactured optical components, each of which is graded by the same subjective visibility assessment against an existing derivative master set. That is a third party manufacturer of derivative master sets, has its own derivative master set, which ideally has been referenced to the original master set held by the Department of Defense, which it uses to bin individual optical components according to imperfection grade, and it is these binned optical components that are then collected together into sets which are sold as master sets to optical components manufacturers. Consequently, these third party manufacturers are selling derivative master sets which suffer from the same, well recognized shortcomings of the inspection method, namely inconsistent grading as a result of the subjective nature of the inspection. The net effect is that, what might be defined as a grade 40 scratch in a reference component of a derivative master set, is actually a grade 20 scratch according to the original master set, so an optical component manufacturer may be assigning incorrect imperfection numbers to all the optical components which are graded by the incorrectly-graded reference imperfection. Large numbers of derivative master sets are therefore in circulation all of which are different, thereby compounding the subjectivity problem.

Because the drawbacks of the MIL-PRF-13830B performance specification were well known, a non-subjective standard ISO10110-7 was defined in 2008 with the idea of replacing MIL-PRF-13830B. Because ISO10110-7 has no subjective element, it is amenable to being automated.

DE 10 2015 201 823 A1 describes an automated test apparatus for inspecting according to ISO10110-7.

It is also known to assess imperfections using a dark-field microscope inspection, in which an imperfection is automatically graded by integrating the total amount of light scattered from the imperfection (https://www.crystran.co.uk/metrology).

Nevertheless, despite its shortcomings, the reflection variant of MIL-PRF-13830B remains a test that is often requested by customers.

The aim of the invention is to provide a computer-automated test apparatus and associated method that replicates the subjective human visual inspection of an imperfection's visibility, and therefore performs as well as an expert human inspector using the original master set. We therefore wish to provide an apparatus and method which provide results which are consistent, reproducible and aligned to the average results obtained from a range of expert inspectors in a range of test facilities across a range of samples.

SUMMARY OF THE INVENTION

According to a first aspect of the invention there is provided an inspection method for components which may bear physical, surface scratches, the method comprising:
- providing a set of one or more reference components with reference scratches of defined grades;
- providing a test component with the purpose of grading any scratches it may have by comparison with the reference scratches;
- providing a dark-field microscope test apparatus having a mount for holding at least one component at a time;
- inspecting each of the components by:
  - arranging a component for inspection in the mount;
  - obtaining a digital image in dark-field of the component, the digital image comprising a plurality of pixels, each having an intensity value;
  - processing the digital image to identify scratches for analysis;
  - for each identified scratch apply a computer-automated analysis to:
    - determine the pixels in the digital image covered by the scratch;
    - compute a total intensity value for the scratch based on the intensity values of the pixels of the scratch;
    - morphologically process the digital image of the scratch to obtain a scratch length value; and
    - divide the total intensity value by the scratch length value to obtain a scratch number; and
  - in the case that the component is a reference component defining the scratch number as corresponding to the grade assigned to that scratch in the reference component; and
  - in the case that the component is a test component comparing the scratch number with scratch numbers obtained from the reference scratches in order to grade the scratch.

The scratch number should thus be representative of the average cross-sectional intensity per unit length of the digital image of the scratch, which according to our intensive testing and comparisons with human visibility inspection appears consistently to correspond to how an expert human inspector grades the visibility of a scratch. In other words, we have proved to ourselves that this particular automated analysis method appears reliably and consistently to mimic the subjective impression that a scratch makes on an expert inspector who is applying the visibility test of MIL-PRF-13830.

The digital image processing can separate out digs from scratches, so that dig inspection can also be incorporated in the method. Once the digital image has been processed to identify digs for analysis, each identified dig is further processed to determine the pixels covered by the dig. According to one approach, the dig pixels are then morphologically processed to obtain a dig diameter, which then allows a dig grade to be assigned according to the performance specification.

According to another approach, a total intensity value for the dig is computed based on the intensity values of the pixels of the dig; and the dig pixels are also morphologically processed to obtain a dig area. The total intensity value is then divided by the dig area to obtain a dig number. In the case that the component is a reference component the dig number is defined as corresponding to the grade assigned to that dig in the reference component. In the case that the component is a test component the dig number is compared with dig numbers obtained from the reference digs in order to assign a dig grade to the dig.

The method is preferably configured to conform with the performance specification of MIL-PRF-13830, i.e. the reference imperfections should conform, and the way in which the inspection of the reference and test components is carried out should also conform, with MIL-PRF-13830.

In certain embodiments, the pixel intensity values in the digital image are pre-processed to remove a background intensity prior to computing the total intensity value of the pixels of the scratch or dig.

The total intensity value can be calculated in several different ways. For example it can be taken as the sum of the intensity values of the pixels of the scratch or dig, or can be obtained indirectly from the intensity values of the pixels of the scratch or dig via interpolation of the intensity values.

The pixels in the digital image corresponding to a particular scratch or dig can be determined using a variety of image processing segmentation techniques. For example, they can be determined by boundary finding or region finding (e.g. blob analysis) or a combination of both.

In a particular workflow, the reference scratches and digs are inspected first to obtain scratch numbers for each grade of scratch and dig, and thereafter the test component and further test components, collectively a batch of test components, are inspected to grade them, with re-inspection of the reference scratches and digs being carried out intermittently between inspecting batches of test component inspections.

At the end of the inspection, the method may conclude in various ways. There may be a pass or fail of the test component, or the test component may be binned into one of several quality levels, based on comparison with a pre-defined specification. A specification report may also be generated for the test component, which lists the scratches and digs of the test component with their grades and specifics of their physical locations.

An inspected component may then be provided with such a specification report generated by the inspection method described above.

A still further aspect of the invention relates to calibrating components for subsequent use as reference components.

This aspect is a method for comparing first and second components bearing physical, surface scratches. The method comprises:

provides a first, relied-upon reference component with reference scratches of a defined grade;

providing a second, would-be reference component with scratches which are supposed to be of the same defined grade or grades as the relied-upon reference scratches;

providing a dark-field microscope test apparatus having a mount for holding at least one component at a time;

inspecting each of the components by:
arranging a component for inspection in the mount;
obtaining a digital image in dark-field of the component, the digital image comprising a plurality of pixels, each having an intensity value;
processing the digital image to identify scratches for analysis;
for each identified scratch:
determine the pixels in the digital image covered by the scratch;
compute a total intensity value for the scratch based on the intensity values of the pixels of the scratch;
morphologically process the digital image of the scratch to obtain a scratch length value; and
divide the total intensity value by the scratch length value to obtain a scratch number, which will be representative of the average cross-sectional intensity per unit length of the digital image of the scratch; and
comparing the scratch number of the scratch in the would-be reference component with the scratch number of the relied-upon reference scratch, and passing or failing the would-be reference scratch for use as a reference scratch based on the difference between its scratch number and that of the relied-upon reference scratch.

The digital image processing can separate out digs from scratches, so that dig inspection can also be incorporated in the method. This can be done by processing the digital image to identify digs for analysis and for each identified dig apply a computer-automated analysis as stated above.

A set of one or more reference components with reference scratches of defined grades can then be provided, wherein each reference scratch has been verified by the above method.

Another aspect of the invention is a test apparatus for inspecting components for physical, surface scratches, the apparatus comprising:

a dark-field microscope having a mount for holding at least one component at a time;
a digital camera operable to obtain digital images in dark-field of components arranged in the mount, the digital image comprising a plurality of pixels, each having an intensity value;
a processing module operable:
to process the digital image to identify scratches for analysis;
to analyse each such scratch in the digital image to:
determine the pixels in the digital image covered by the scratch;
compute a total intensity value for the scratch based on the intensity values of the pixels of the scratch;
morphologically process the digital image of the scratch to obtain a scratch length value; and
divide the total intensity value by the scratch length value to obtain a scratch number, which will be representative of the average cross-sectional intensity per unit length of the digital image of the scratch.

The digital image processing can separate out digs from scratches, so that dig inspection can also be carried out. This can be done by processing the digital image to identify digs for analysis and for each identified dig apply a computer-automated analysis as stated above.

In the test apparatus, the processing module can be further configured to grade the scratch with reference to scratch numbers obtained by the test apparatus from the reference scratches, and similarly for digs.

In the test apparatus, the processing module can be further configured to define the scratch number as specifying a grade in the case the scratch is a reference scratch of defined grade, and similarly for digs.

In the test apparatus, the processing module can be further configured to compare the scratch number with a scratch number obtained by the test apparatus for a relied-upon reference component and passing or failing the scratch for use as a reference scratch based on the difference between its scratch number and that of the relied-upon reference scratch, and similarly for digs.

In another aspect of the invention there is provided a computer program product bearing machine readable instructions which when executed on a computer perform the following process:

receive a dark-field microscope digital image comprising a plurality of pixels, each having an intensity value;
process the digital image to identify scratches for analysis;
analyse each such scratch in the digital image to:
determine the pixels in the digital image covered by the scratch;
compute a total intensity value for the scratch based on the intensity values of the pixels of the scratch;
morphologically process the digital image of the scratch to obtain a scratch length value; and
divide the total intensity value by the scratch length value to obtain a scratch number, which will be representative of the average cross-sectional intensity per unit length of the digital image of the scratch.

The process can also include machine readable instructions which when executed on a computer separate out digs from scratches, so that dig processing and grading can also be carried out. This can be done by processing the digital image to identify digs for analysis and for each identified dig apply a computer-automated analysis as stated above.

BRIEF DESCRIPTION OF THE DRAWINGS

This invention will now be further described, by way of example only, with reference to the accompanying drawings.

DETAILED DESCRIPTION

Figure 1:
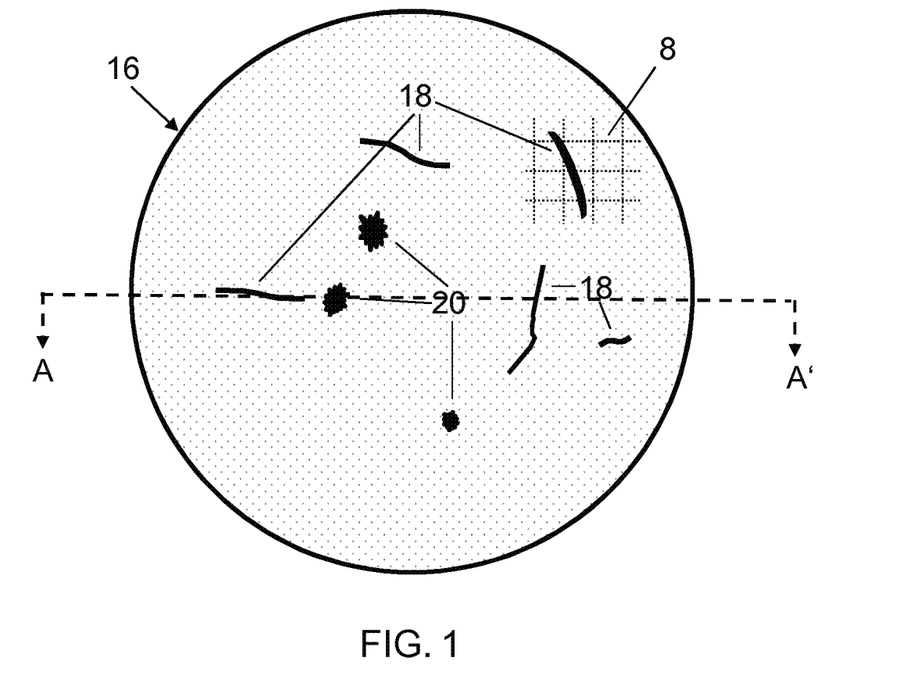
FIG. 1 is a schematic drawing of an example component with surface imperfections.

FIG. 1 is a schematic drawing of an example component 16 with physical, surface imperfections in the form of scratches 18 and digs 20 where the lead lines from the reference numerals can be recognized, since they are straight lines. The component 16 may be a reference component or a test component, where imperfections on the former are used to classify ones on the latter. Also shown is a portion of image tiles 8 which are described further below.

Figure 2:
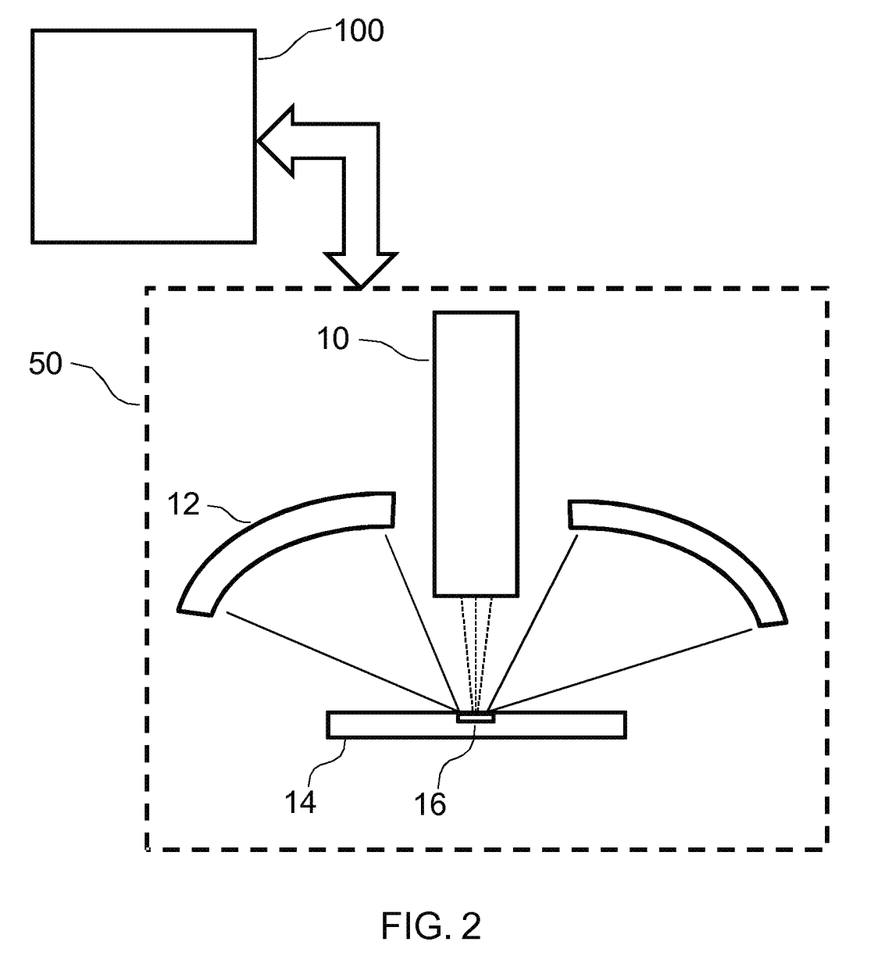
FIG. 2 is a schematic drawing of a test apparatus for implementing the proposed method.

FIG. 2 is a schematic drawing of a test apparatus for implementing the proposed method. The test apparatus is essentially a dark-field microscope system 50 connected via a suitable interface to a computer system 100 which can be used both to control the microscope system 50 for image acquisition and to process the images thus obtained. Alternatively separate computers could be used for microscope control and image processing. The dark-field microscope system 50 comprises image collection optics 10 including a microscope objective and a charged coupled device (CCD) for recording digital images. The images may be recorded as greyscale images, i.e. monochrome, or colour images as desired. The microscope system 50 includes a sample stage 14 which includes a mount shaped and sized to hold the type of components it is desired to inspect and a translation stage, such as an xy-stage, for moving a sample 16 arranged therein in a plane orthogonal to the optical axis of the image collection optics 10. Positioning in the z-direction along the optical axis of the image collection optics 10 may be effected by a translator that forms part of the image collection optics 10 or the mount or both. The off-axis illumination that is part of the dark-field set up is provided by an illumination source 12 where care should be taken to ensure power output stability of the illumination source 12.

An image of the component is acquired by the microscope system in tiles 8. The tiles are typically square or rectangular. The image is built up by scanning the xy-stage in increments and taking a tile image at each increment. This will typically done line by line. For example, the tiles may be 5×5 mm and the component size 40×40 mm. To aid stitching of the tiles, the increments are preferably a little smaller than the tile size so that adjacent tiles overlap slightly.

Figure 3:
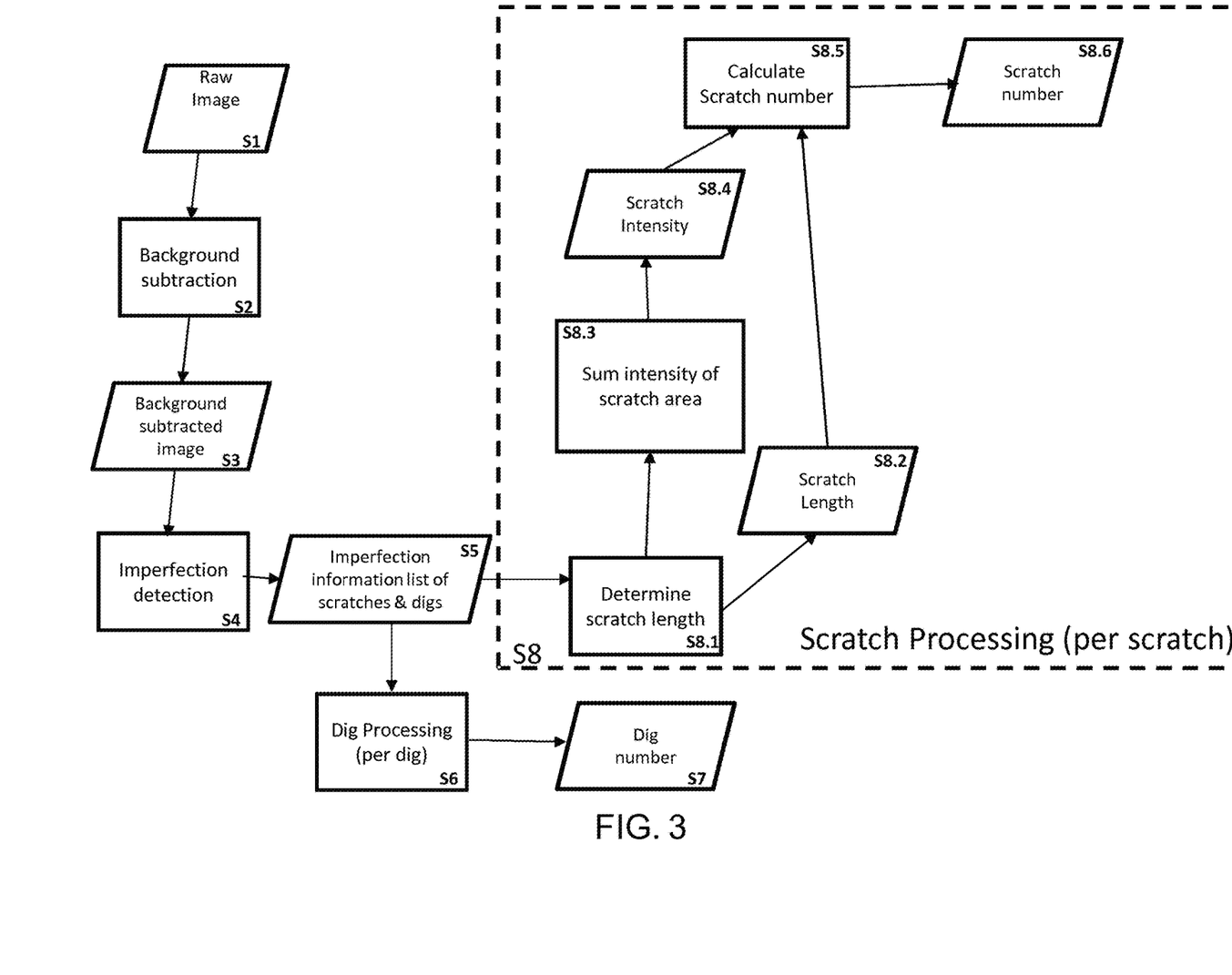
FIG. 3 is a flow diagram of the image processing part of the proposed method.

FIG. 3 is a flow diagram of the image processing part of the proposed method. Rectangular boxes are used to denote processes and rhomboidal boxes to denote outputs.

At Step S1, the image processing receives as input a digital image taken by the dark-field microscope system of the component to inspect. If the image is not at this stage greyscale, it is now converted from colour to greyscale by a suitable transform.

Figure 4:
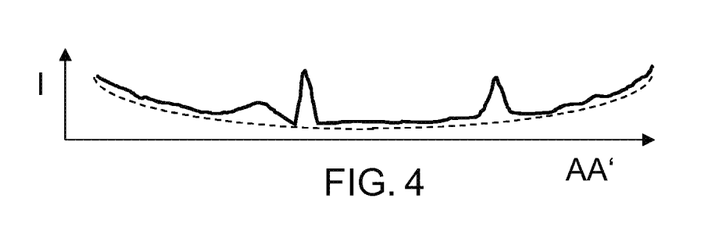
FIG. 4 is a schematic cross-section which shows with the solid line the intensity distribution of an image along a cross-section through line A-A of FIG. 1, and with the dotted line the background intensity distribution through the same cross-section.

At Step S2, the image has its background determined and subtracted. Background subtraction may be based on interpolating to obtain a spatial intensity distribution over the full image area of the component and subtracting this spatial intensity distribution from the raw image. By way of schematic illustration of the background subtraction, FIG. 4 shows schematically with the solid line the raw intensity distribution of an image along a cross-section through line A-A of FIG. 1, and with the dotted line the background intensity distribution computed by interpolation of the raw intensity distribution. Although this is illustrated as a one-dimensional function, it will be appreciated that it will be two-dimensional. As an alternative to, or in conjunction with, interpolation it is possible to use Fourier transfer techniques to filter imperfection signal contributions from background signal contributions based on spatial frequency, where frequency components below a threshold are deemed to be background and above a threshold useful signal from an imperfection scattering light from the illumination source 12 into the numerical aperture of the collection optics 10.

At Step S3, the image with its background subtracted is output to use as the basis for further processing.

At Step S4, imperfections are identified in the image by segmentation techniques. (The background removal in Step S3 may be regarded as part of the segmentation.) Segmentation of the already background-subtracted image can start with a thresholding technique. For example, all pixels with intensity below a certain threshold can have their intensity values set to zero. The threshold can be determined adaptively based on the intensity values in the image data. All pixels with intensity values above the threshold have their intensity values retained. The imperfections and their extent can then be identified using one or more standard segmentation techniques, such as boundary analysis, to identify the boundary of each imperfection, or a region-based approach such as so-called blob finding, to find the area occupied by each imperfection. Whether the segmentation determines the boundary or the region, the outcome is the same, namely knowledge of which pixels are pixels of a particular imperfection. The skilled person is aware of suitable segmentation techniques, for example as described in Gonzalez & Woods "Digital Image Processing" 3rd Edition, Prentice Hall 2008 ISBN 013168728X, 9780131687288—in particular in Chapter 10 on segmentation, the contents of which are incorporated herein by reference.

The segmentation can be done on-the-fly on each image tile as it is acquired, rather than applying the segmentation to the whole image after stitching all the tiles together. When the segmentation is done per tile, then imperfections that touch a tile boundary are logged as potential imperfection fragments, so that when the adjacent tile is processed the likely imperfection fragment can be linked to another imperfection fragment on the adjacent tile. In this way imperfections that cross one or more tile boundaries can be fitted together in an efficient manner. This will be most relevant for scratches, but could also occasionally be relevant for digs. Scratches or digs that pass through tile boundaries thus have their fragments combined by tagging the boundary locations on each tile. Alternatively, the segmentation may first be applied on the whole image after stitching.

With the pixels of each imperfection now known, each imperfection can be sub-classified into either a scratch or a dig. This sub-classification is done based on a morphological analysis of the shape of the imperfection. A bounding box can be fitted to each imperfection, and the aspect ratio of the bounding box used to define an imperfection as a dig (low aspect ratio and a relatively high value of imperfection area to bounding box area greater than a threshold value of say 1/4) or a scratch (high aspect ratio, or low aspect ratio and relatively low ratio of imperfection area to bounding box area). At Step S5, the output is shown from Step S4, which is a set of collated data, e.g. in list form, on the imperfections, with the imperfection type, associated pixels for the imperfection and so forth.

The process flow now splits, with the digs being analysed separately from the scratches. The dig processing takes place in Step S6 and involves obtaining the dig number. Dig number can be obtained from dig diameter. Dig diameter can be determined by first computing the centre of the dig (e.g. from computing the centre of mass of the dig pixels) and then computing an average of the distance from the dig centre to the dig periphery over the full 360 degrees to obtain an average dig radius. This approach would strictly conform to the performance specification. An alternative approach which in practice may produce acceptable results, while not following the geometrical definition set out in the performance specification for digs would be to compute the dig number in a similar way to how we proposed for scratch number based on a total intensity value. That is, a dig number could be set by determining an integrated intensity value and then dividing it by the dig area, e.g. number of pixels in the dig.

The dig number for a particular dig is output in Step S7. A single number, the dig number, is the overall output of the image processing of each dig, and this is used in the overall process flow as described in detail further below, but in short, if the component being inspected is a reference component, which means the dig defines a certain grade, then the dig number then becomes associated with that grade, whereas, if the component being inspected is a test component, then the dig number will be compared against the dig numbers of known grades obtained from the reference components, so that the dig in the test component can be assigned a grade.

Returning now to the scratch processing, this takes place in Step S8, which is sub-divided into Steps 8.1 to 8.6.

In Step S8.1, the digital image from Step S5 is morphologically processed to obtain a scratch length value for each scratch. This may be based on the bounding box already fitted to each scratch as part of classifying the imperfections between scratches and digs in Step S4.

The scratch length value is output in Step S8.2.

In Step S8.3, the digital image from Step S5 is processed to compute a total intensity value for the scratch based on the intensity values of the pixels of the scratch. One approach for computing the total intensity value is simply to sum the intensity values of each pixel in the scratch area—noting the background intensity was already subtracted in Step S3. In a slight variant, boundary pixels may have their intensity values reduced depending on how much of the pixel area is deemed to lie in the imperfection. Another approach would be to obtain a fit of the intensity distribution for the scratch area, for example based on interpolation of the intensity values for each pixel, and integrate the volume under the fitted surface of the intensity distribution function.

The total intensity value for the scratch is output in Step S8.4.

In Step S8.5, the total intensity value of the scratch is divided by the scratch length value to obtain a scratch number, which is a single number that is a measure of the visibility of the scratch.

The scratch number is output in Step S8.6 and is the overall output of the image processing of the scratch, and this is used in the overall process flow as described in detail further below, but in short, if the component being inspected is a reference component, which means the scratch defines a certain grade, then the scratch number then becomes associated with that grade, whereas, if the component being inspected is a test component, then the scratch number will be compared against the scratch numbers of scratches of known grades obtained from the reference components, so that the scratch in the test component can be assigned a grade.

Figure 5:
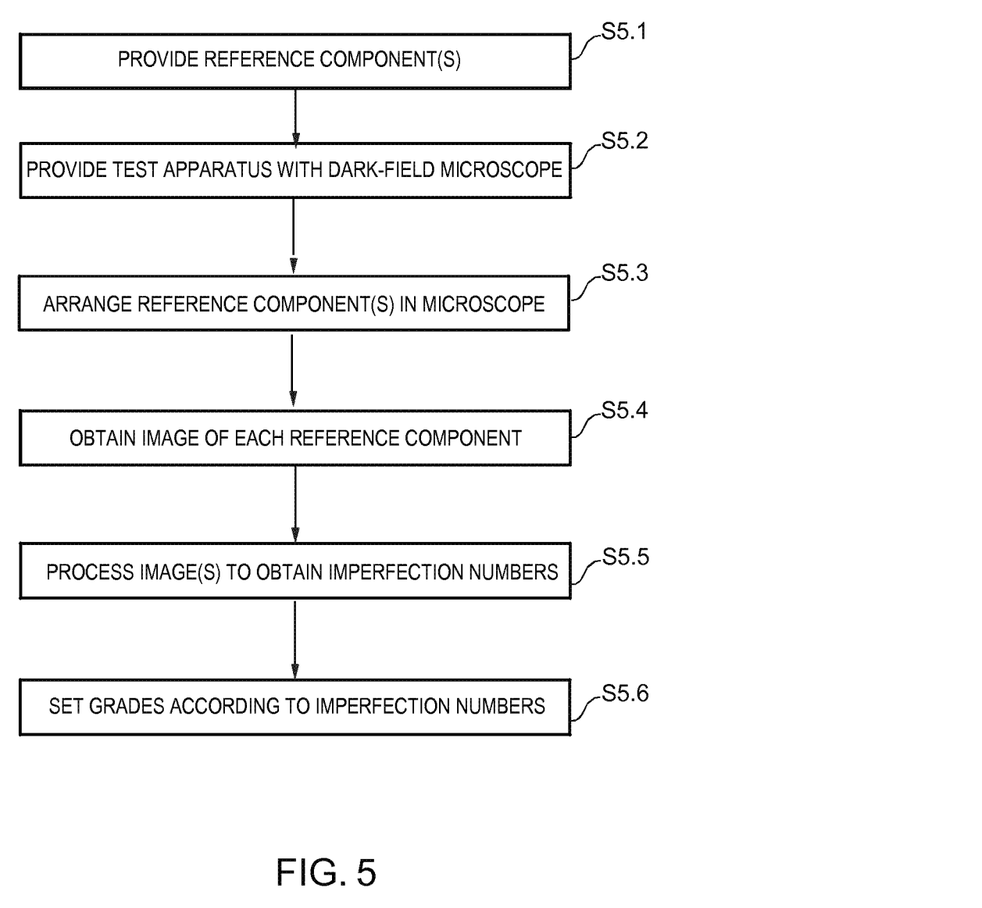
FIG. 5 is a flow diagram of a first part of the proposed method where the grade levels of the test apparatus are set by inspecting reference imperfections on reference components.

FIG. 5 is a flow diagram of the first part of the workflow of the proposed method where the grade levels of the test apparatus are set by inspecting the reference components.

In Step S5.1, a set of one or more reference components is provided. The reference component(s) bear reference scratches of defined grades.

In Step S5.2, a dark-field microscope test apparatus is made available. The microscope apparatus includes a suitable holder for mounting one or more of the reference components at a time.

In Step S5.3, a reference component is placed in the holder in preparation for inspection. In different implementations, there may be holders in the mount for one, two, three or more components. The holder may also include robotic automation to shuttle between different components, and also to load and unload components from a magazine into the holder, as is known from microscopy automation. Multiple reference components, multiple test components, or a mixture of reference and test components could be loaded into the holder as desired.

In Step S5.4, the microscope is operated to obtain a digital image in dark-field of the component in the holder. The digital image comprises a plurality of pixels, each having an intensity value. It is envisaged that the digital image will in most cases be a two-dimensional image. However, the digital image that is acquired could be a three-dimensional image, e.g. obtained through z-stacking. In the case of three-dimensional image acquisition, the three-dimensional image file could be composited into a two-dimensional image file, wherein compositing is a known technique in volume rendering, which could then be processed as described in detail herein. On the other hand, a modified version of the image processing method described herein could be created to process three-dimensional image files.

An improvement in practical operation can be achieved if multiple digital images are acquired of each reference component under different exposure conditions, so the imperfections are captured at different overall image brightnesses. Specifically, we collect a set of images of each reference component, each image of the set being collected with a different exposure. A linear fit can then be made of exposure against brightness. The advantage of this improvement is that when test components are measured, this can be done under any desired exposure. The test component image can then be obtained using the exposure that provides the best image, i.e. the exposure can be freely adjusted when acquiring the test component images. In the image processing, the total intensity value of each imperfection in a test component is then compared to a total intensity value for the reference component under the same or matched exposure conditions in order to grade the scratch.

In Step S5.5, the digital image is processed as described in detail above with reference to FIG. 3. The output of this step is an imperfection number for each reference imperfection, i.e. for each reference scratch and reference dig.

Since each imperfection in the workflow of FIG. 5 is a reference imperfection, the imperfection number is used to set the grade levels (or grade boundaries) that are to be applied when assessing test component imperfections. For example, in the case of scratches, there will be reference scratches on one or more reference components, and these will be for scratch grades 10, 20, 40, 60 and 80, and the outcome of the workflow of FIG. 5 could be as follows:

| Grade | Grade Boundary (Scratch Number) |
|---|---|
| 10 | 8,932 |
| 20 | 15,396 |
| 40 | 28,640 |
| 60 | 47,014 |
| 80 | 58,449 |

Of course the grade boundary numbers are entirely arbitrary and they do not need to be normalised, since the concept of MIL-PRF-13830 is to compare visibility of reference scratches (or digs) with test scratches (or digs).

It will also be appreciated that the reference components may contain only one imperfection of each grade and type, or may contain multiple imperfections of each grade and type. In the latter case, the grade boundaries can be the average of the imperfection numbers obtained from the same grade reference imperfections.

Figure 6:
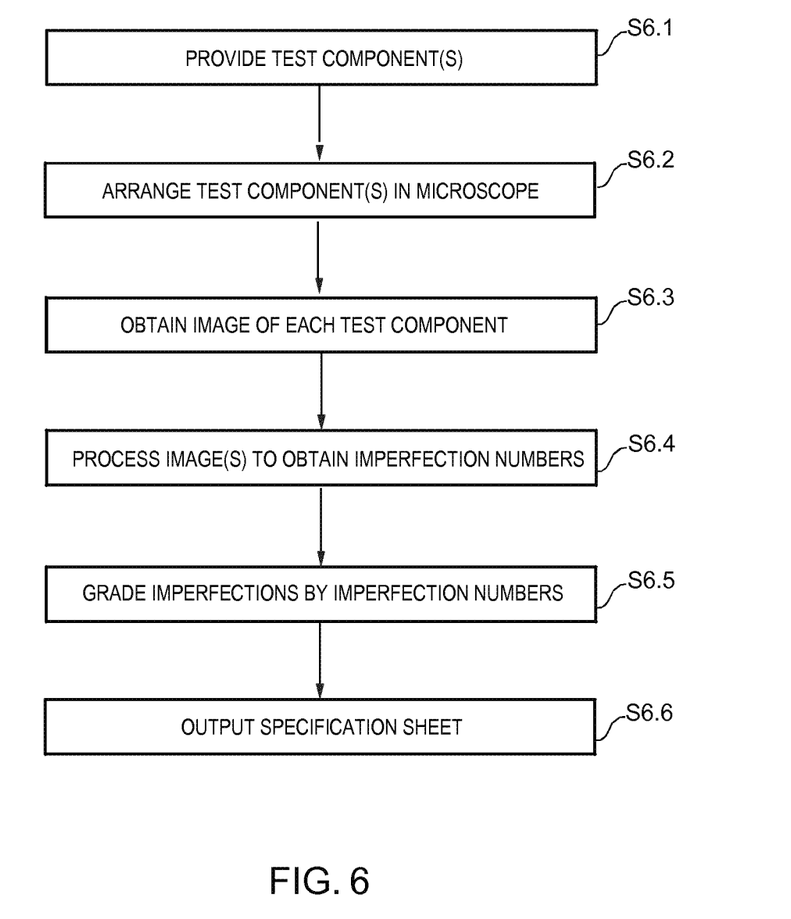
FIG. 6 is a flow diagram of a second part of the proposed method where test components are inspected and their imperfections are allocated grades according to the grade levels obtained from the first part of the method.

FIG. 6 is a flow diagram of the second part of the workflow proposed method where test components are inspected and their imperfections are allocated grades according to the grade levels obtained from the reference components in the first part of the workflow as shown in FIG. 5.

In Step S6.1, a test component is provided. The test component has an unknown surface state and the purpose of the inspection is to examine whether the test component surface has physical surface imperfections, and if yes, to grade them according to their visibility with reference to the reference imperfections.

In Step S6.2, the test component is placed in the holder of the dark-field microscope in preparation for inspection.

In Step S6.3, the microscope is operated to obtain a digital image in dark-field of the component in the holder. The digital image is as described above with reference to Step S5.4.

In Step S6.4, the digital image is processed as described in detail above with reference to FIG. 3. The output of this step is an imperfection number for each imperfection in the test component, i.e. for each scratch and dig.

In Step S6.5, the imperfection number of each imperfection is graded with comparison to the grade boundaries obtained from the reference imperfections. For example, let us assume we find 4 scratches on a particular test component, and the scratches have scratch numbers: 7,221; 18,100; 23,914; and 29,552. These would be graded according to the above table as the following grades: 10, 40, 40, 60. Dig grading is carried out similarly.

In Step S6.6, a specification sheet is output for the test component, which is a report containing a summary of its inspection. The report will separately list the scratches and digs that have been found on the test component with their grades and also with information on where they are on the surface, e.g. centre xy-coordinates of each imperfection referenced to a corner of the component, or a centre of the component. It may also be useful to record some detail on the geometrical properties of each imperfection such as total area, length, aspect ratio etc.

In a production line environment, instead of, or as well as, preparing a report, the outcome of the inspection could be used to pass or fail the component, or to bin the component in different quality levels. For example there might be 5 quality levels: unacceptable for any use (dispose of component); rough quality; medium quality; high quality; premium quality (no imperfections). The quality measure may include a permitted worst scratch grade and/or permitted maximum number of imperfections, or a combination of both, as well as other scratch metrics, as desired. The pass/fail test or binning could be automated with robotic machinery, or carried out by an operator.

Although in practice, the reference components will probably be inspected prior to the test components as described above with reference to FIG. 5 and FIG. 6, the image acquisition order and the order in which the image processing of FIG. 3 is performed on the reference and test imperfections is arbitrary, so, for example, steps S6.3 and S6.4 could take place before or in parallel with Steps S5.4 and S5.5.

Figure 7:
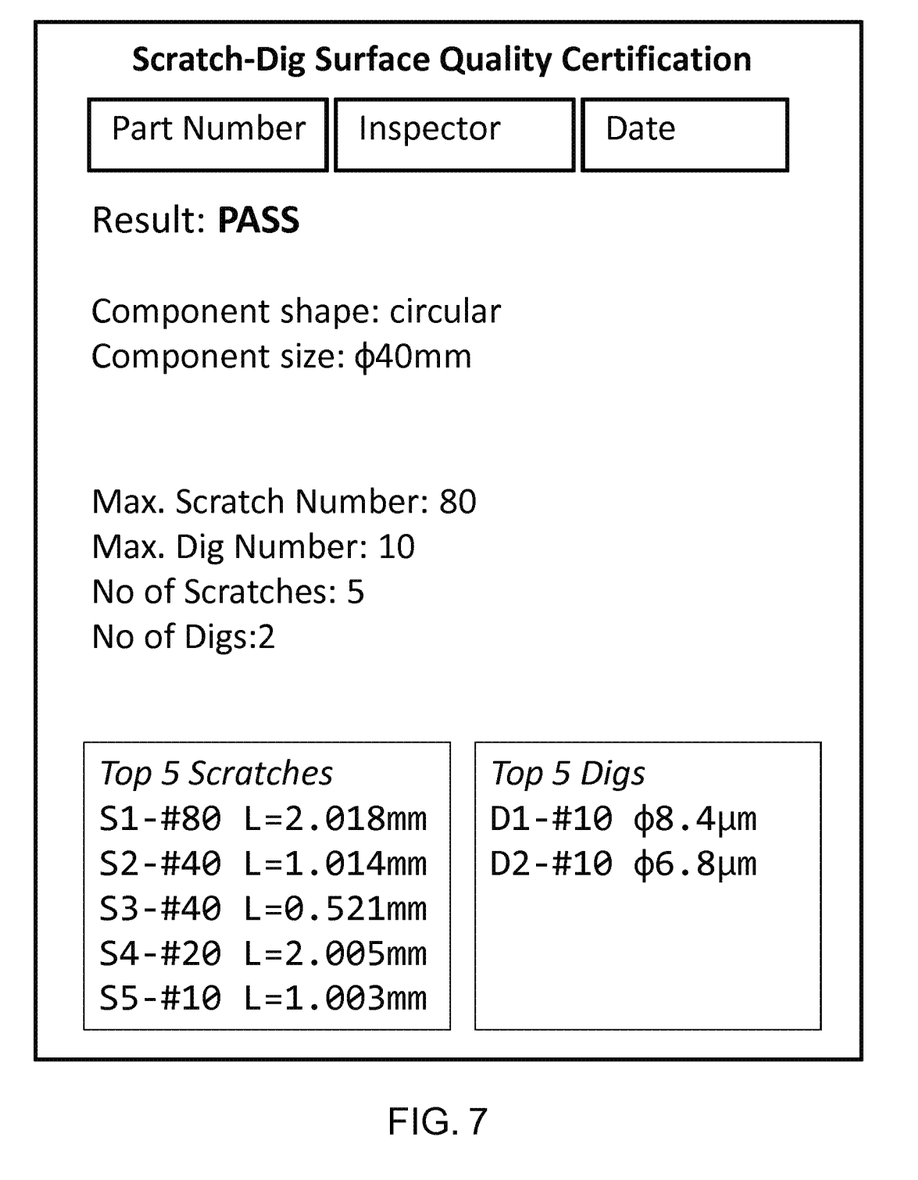
FIG. 7 is a schematic representation of an example specification sheet as constitutes an output from the proposed method.

FIG. 7 is a schematic representation of an example specification sheet as constitutes an output from the proposed method. The specification sheet will summarise the inspection findings as well as including general information on the component tested, the inspector, the date/time of the inspection and so forth. A non-exhaustive list of the inspection data that may be included is as follows:

Headline "PASS/FAIL" or "QUALITY LEVEL" statement.
Maximum Scratch Number Measured (e.g. #80 grade)
Maximum Dig Number Measured
Number of Scratches Identified
Number of Digs Identified
Top 5 Scratches sorted first by grade and then by length
Top 5 Digs Number of Digs Measured sorted by grade then by measured diameter.
Schematic drawing of component with top scratches and digs represented and labelled.
Shape of Inspected Component (e.g. rectangular, square, circular)
Top 5 Scratches sorted first by grade and then by length.
Top 5 Digs sorted by grade then by diameter.

Figure 8:
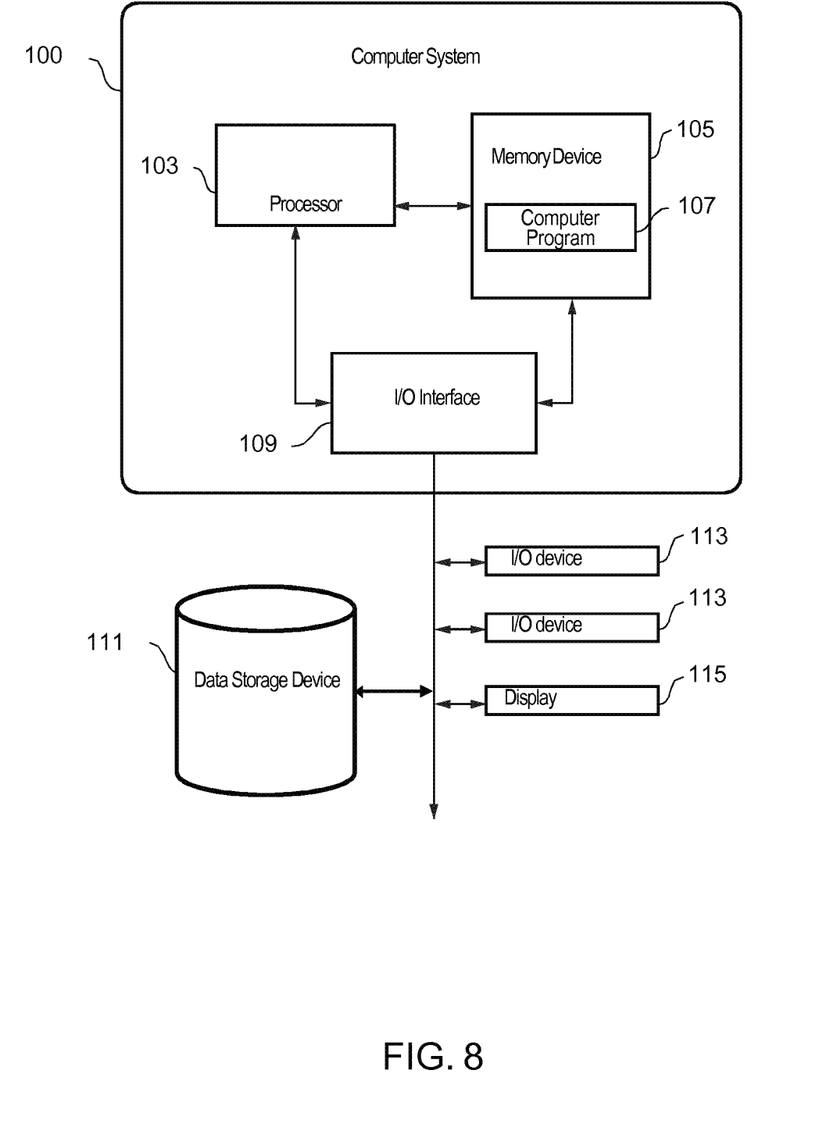
FIG. 8 shows a structure of a computer system and computer program suitable for performing aspects of the proposed method.

FIG. 8 shows a structure of a computer system 100 and computer program 107 that may be used to implement at least parts of the above-described methods for image acquisition, i.e. control of the microscope test apparatus and/or for the processing of the digital images up to and including the final outputs of the inspection methods.

The computer system 100 comprises a processor 103 coupled through one or more I/O Interfaces 109 to one or more hardware data storage devices 111 and one or more I/O devices 113, which can manage graphic object requests, and a display 115 on which the graphics objects can be displayed. The processor 103 may also be connected to one or more memory devices 105. At least one memory device 105 contains stored computer program 107, which is a computer program that comprises computer-executable instructions. The stored computer program 107 includes a program that implements a method for the efficient selection of runtime rules for programmable search in accordance with the present example. The data storage devices 111 may store the computer program 107. The computer program 107 stored in the storage devices 111 is configured to be executed by processor 103 via the memory devices 105. The processor 103 executes the stored computer program 107.

It will be clear to one of ordinary skill in the art that all or part of the logical process steps of any embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of any embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computer system to perform all the steps of the method.

It will be appreciated that the method and components of any embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device Aspects of the present invention include a computer apparatus, a computer-automated method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that new versions of MIL-PRF-13830, in addition to known versions A and B, may be promulgated from time to time, or derivative standards, and it is intended that the presently claimed methods and apparatus should cover those to the extent this is sensible and that any adaptations which are necessary lie within the abilities of the skilled person.

It will be understood that MIL-PRF-13830 was intended for inspection of optical components, but in principle the performance specification, and hence the current invention, could be applied to inspection of imperfections in any component surface which is amenable to dark-field imaging and the proposed automated analysis methods.

The invention claimed is:

1. An inspection method for components which may bear physical, surface scratches, the method comprising:
   providing a set of one or more reference components with reference scratches of defined grades;
   providing a test component with the purpose of grading any scratches it may have by comparison with the reference scratches;
   providing a dark-field microscope test apparatus having a mount for holding at least one component at a time;
   inspecting each of the components by:
   arranging a component for inspection in the mount;
   obtaining a digital image in dark-field of the component, the digital image comprising a plurality of pixels, each having an intensity value;
   processing the digital image to identify scratches for analysis;
   for each identified scratch apply a computer-automated analysis to:
   determine the pixels in the digital image covered by the scratch;
   compute a total intensity value for the scratch based on the intensity values of the pixels of the scratch;
   morphologically process the digital image of the scratch to obtain a scratch length value; and
   divide the total intensity value by the scratch length value to obtain a scratch number; and
   in the case that the component is a reference component defining the scratch number as corresponding to the grade assigned to that scratch in the reference component; and
   in the case that the component is a test component comparing the scratch number with scratch numbers obtained from the reference scratches in order to grade the scratch.

2. The method of claim 1, wherein the pixel intensity values in the digital image are pre-processed to remove a background intensity prior to computing the total intensity value of the pixels of the scratch.

3. The method of claim 1, wherein the total intensity value is the sum of the intensity values of the pixels of the scratch.

4. The method of claim 1, wherein the total intensity value is obtained indirectly from the intensity values of the pixels of the scratch via interpolation of the intensity values.

5. The method of claim 1, wherein the pixels in the digital image corresponding to a scratch are determined by at least one of: boundary finding and blob analysis.

6. The method of claim 1, wherein the reference scratches are inspected first to obtain scratch numbers for each grade of scratch, and thereafter the test component and further test components, collectively a batch of test components, are inspected to grade them, with re-inspection of the reference scratches being carried out intermittently between inspecting batches of test component inspections.

7. The method of claim 1, further comprising:
   processing the digital image to identify digs for analysis;
   for each identified dig apply a computer-automated analysis to:
   determine the pixels in the digital image covered by the dig; and
   morphologically process the digital image of the dig to obtain a dig diameter; and
   assigning a dig grade according to the dig diameter.

8. The method of claim 1, further comprising:
   processing the digital image to identify digs for analysis;
   for each identified dig apply a computer-automated analysis to:
   determine the pixels in the digital image covered by the dig;
   compute a total intensity value for the dig based on the intensity values of the pixels of the dig;
   morphologically process the digital image of the dig to obtain a dig area; and
   divide the total intensity value by the dig area to obtain a dig number; and
   in the case that the component is a reference component defining the dig number as corresponding to the grade assigned to that dig in the reference component; and
   in the case that the component is a test component comparing the dig number with dig numbers obtained from the reference digs in order to assign a dig grade the dig.

9. The method of claim 1, wherein the mount is configured to mount at least two of the components at a time.

10. The method of claim 1, wherein the reference scratches conform to performance specification MIL-PRF-13830, and the method grades scratches in the test component according to the performance specification MIL-PRF-13830A from 1963 or MIL-PRF-13830B from 1997.

11. The method of claim 1, further comprising passing or failing the test component, or binning the test component, based on comparison with a pre-defined specification.

12. The method of claim 1, wherein obtaining the digital image in dark-field of the component comprises acquiring the digital image as a plurality of tiles which collectively cover the component; and the computer-automated analysis determines the pixels in the digital image covered by the scratch on a per tile basis, in which scratches that pass through tile boundaries are treated as a single scratch by tagging their boundary locations on each tile.

13. The method of claim 1,
wherein in the case that the component is a reference component, a plurality of dark-field digital images of the reference component are obtained, each with a different exposure, and
wherein in the case that the component is a test component comparing the scratch number with scratch numbers obtained from the reference scratches at a matched exposure in order to grade the scratch.

14. The method of claim 1, further comprising generating a specification report for the test component which lists the scratches of the test component with their grades and specifies their physical locations.

15. A method for comparing first and second components bearing physical, surface scratches, the method comprising:
providing a first, relied-upon reference component with reference scratches of a defined grade;
providing a second, would-be reference component with scratches which are supposed to be of the same defined grade or grades as the relied-upon reference scratches;
providing a dark-field microscope test apparatus having a mount for holding at least one component at a time;
inspecting each of the components by:
arranging a component for inspection in the mount;
obtaining a digital image in dark-field of the component, the digital image comprising a plurality of pixels, each having an intensity value;
processing the digital image to identify scratches for analysis;
for each identified scratch:
determine the pixels in the digital image covered by the scratch;
compute a total intensity value for the scratch based on the intensity values of the pixels of the scratch;
morphologically process the digital image of the scratch to obtain a scratch length value; and
divide the total intensity value by the scratch length value to obtain a scratch number, which will be representative of the average cross-sectional intensity per unit length of the digital image of the scratch; and
comparing the scratch number of the scratch in the would-be reference component with the scratch number of the relied-upon reference scratch, and passing or failing the would-be reference scratch for use as a reference scratch based on the difference between its scratch number and that of the relied-upon reference scratch.

16. A test apparatus for inspecting components for physical, surface scratches, the apparatus comprising:

a dark-field microscope having a mount for holding at least one component at a time;
a digital camera operable to obtain digital images in dark-field of components arranged in the mount, the digital image comprising a plurality of pixels, each having an intensity value;
a processing module operable:
to process the digital image to identify scratches for analysis;
to analyse each such scratch in the digital image to:
determine the pixels in the digital image covered by the scratch;
compute a total intensity value for the scratch based on the intensity values of the pixels of the scratch;
morphologically process the digital image of the scratch to obtain a scratch length value; and
divide the total intensity value by the scratch length value to obtain a scratch number, which will be representative of the average cross-sectional intensity per unit length of the digital image of the scratch.

17. The test apparatus of claim 16, wherein the processing module is further configured to grade the scratch with reference to scratch numbers obtained by the test apparatus from the reference scratches.

18. The test apparatus of claim 16, wherein the processing module is further configured to define the scratch number as specifying a grade in the case the scratch is a reference scratch of defined grade.

19. The test apparatus of claim 16, wherein the processing module is further configured to compare the scratch number with a scratch number obtained by the test apparatus for a relied-upon reference component and passing or failing the scratch for use as a reference scratch based on the difference between its scratch number and that of the relied-upon reference scratch.

20. A computer program product bearing non-transitory machine readable instructions which when executed on a computer perform the following process:
receive a dark-field microscope digital image comprising a plurality of pixels, each having an intensity value;
process the digital image to identify scratches for analysis;
analyse each such scratch in the digital image to:
determine the pixels in the digital image covered by the scratch;
compute a total intensity value for the scratch based on the intensity values of the pixels of the scratch;
morphologically process the digital image of the scratch to obtain a scratch length value; and
divide the total intensity value by the scratch length value to obtain a scratch number, which will be representative of the average cross-sectional intensity per unit length of the digital image of the scratch.

* * * * *